United States Patent
Parker et al.

(10) Patent No.: US 10,469,380 B2
(45) Date of Patent: *Nov. 5, 2019

(54) TABLE-DRIVEN ROUTING IN A DRAGONFLY PROCESSOR INTERCONNECT NETWORK

(71) Applicant: Intel Corporation, Santa Clara, CA (US)

(72) Inventors: Mike Parker, Seattle, WA (US); Steve Scott, Seattle, WA (US); Albert Cheng, Seattle, WA (US); Robert Alverson, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 15/063,191

(22) Filed: Mar. 7, 2016

(65) Prior Publication Data

US 2016/0294694 A1    Oct. 6, 2016

Related U.S. Application Data

(63) Continuation of application No. 13/290,567, filed on Nov. 7, 2011, now Pat. No. 9,282,037.

(Continued)

(51) Int. Cl.
*H04L 12/741* (2013.01)
*G06F 15/173* (2006.01)

(Continued)

(52) U.S. Cl.
CPC ...... *H04L 45/745* (2013.01); *G06F 15/17312* (2013.01); *G06F 15/17362* (2013.01);
(Continued)

(58) Field of Classification Search
CPC ... G06F 15/173; H04L 12/713; H04L 12/729; H04L 45/586; H04L 45/745; H04L 45/02; H04L 12/741
See application file for complete search history.

(56) References Cited

U.S. PATENT DOCUMENTS

| 4,970,658 A | 11/1990 | Durbin et al. |
| 5,079,738 A | 1/1992 | Bockenfeld |

(Continued)

FOREIGN PATENT DOCUMENTS

| EP | 2451127 | 5/2012 |
| EP | 2461254 | 6/2012 |

(Continued)

OTHER PUBLICATIONS

Technology-Driven, Highly-scalable Dragonfly Topology, 2008 IEEE John Kim, p. 78-88.*

(Continued)

*Primary Examiner* — Anez C Ebrahim
(74) *Attorney, Agent, or Firm* — Alliance IP, LLC

(57) ABSTRACT

A multiprocessor computer system comprises a dragonfly processor interconnect network that comprises a plurality of processor nodes and a plurality of routers. The routers are operable to route data by selecting from among a plurality of network paths from a target node to a destination node in the dragonfly network based on one or more routing tables.

18 Claims, 9 Drawing Sheets

Related U.S. Application Data

(60) Provisional application No. 61/410,641, filed on Nov. 5, 2010.

(51) Int. Cl.
  *H04L 12/701* (2013.01)
  *H04L 12/729* (2013.01)
  *H04L 12/751* (2013.01)
  *H04L 12/713* (2013.01)

(52) U.S. Cl.
  CPC .............. *H04L 45/00* (2013.01); *H04L 45/02* (2013.01); *H04L 45/10* (2013.01); *H04L 45/125* (2013.01); *H04L 45/586* (2013.01)

(56) References Cited

U.S. PATENT DOCUMENTS

| | | | |
|---|---|---|---|
| 5,249,283 | A | 9/1993 | Boland |
| 5,425,029 | A | 6/1995 | Hluchyj et al. |
| 5,864,738 | A | 1/1999 | Kessler et al. |
| 5,881,135 | A | 3/1999 | Watts et al. |
| 5,970,232 | A | 10/1999 | Passint et al. |
| 6,212,636 | B1 | 4/2001 | Boyle et al. |
| 6,643,764 | B1 | 11/2003 | Thorson et al. |
| 6,766,424 | B1 | 7/2004 | Wilson |
| 7,139,926 | B1 | 11/2006 | Madhav et al. |
| 7,409,506 | B2 | 8/2008 | Kamigata et al. |
| 7,675,857 | B1 | 3/2010 | Chesson |
| 8,018,860 | B1 | 9/2011 | Cook |
| 8,260,922 | B1 | 9/2012 | Aggarwal et al. |
| 8,427,980 | B2 | 4/2013 | McLaren et al. |
| 8,489,718 | B1 | 7/2013 | Brar et al. |
| 8,495,194 | B1 | 7/2013 | Brar et al. |
| 8,576,715 | B2 | 11/2013 | Bloch et al. |
| 9,137,143 | B2 | 9/2015 | Parker et al. |
| 9,282,037 | B2 | 3/2016 | Parker et al. |
| 9,614,786 | B2 | 4/2017 | Kim et al. |
| 2002/0124134 | A1 | 9/2002 | Chilton |
| 2002/0131362 | A1 | 9/2002 | Callon |
| 2003/0088696 | A1 | 5/2003 | McCanne |
| 2005/0073958 | A1 | 4/2005 | Atlas et al. |
| 2005/0177344 | A1 | 8/2005 | Khaleel |
| 2005/0289101 | A1 | 12/2005 | Jayasimha et al. |
| 2007/0198675 | A1 | 8/2007 | Amanuddin et al. |
| 2008/0025208 | A1 | 1/2008 | Chan |
| 2008/0123679 | A1 | 5/2008 | Scott et al. |
| 2008/0285562 | A1 | 11/2008 | Scott et al. |
| 2009/0106529 | A1 | 4/2009 | Abts et al. |
| 2010/0049942 | A1 | 2/2010 | Kim et al. |
| 2010/0103813 | A1 | 4/2010 | Allan et al. |
| 2010/0228798 | A1 | 9/2010 | Kodama et al. |
| 2010/0265956 | A1* | 10/2010 | Li .......................... H04L 45/02 370/401 |
| 2011/0153942 | A1 | 6/2011 | Jain et al. |
| 2011/0191088 | A1 | 8/2011 | Hsu et al. |
| 2012/0020349 | A1 | 1/2012 | Dunwoody et al. |
| 2012/0059938 | A1 | 3/2012 | Albing et al. |
| 2012/0072602 | A1 | 3/2012 | Marr et al. |
| 2012/0072614 | A1 | 3/2012 | Marr et al. |
| 2012/0144064 | A1 | 6/2012 | Parker et al. |
| 2012/0144065 | A1 | 6/2012 | Parker et al. |
| 2015/0186318 | A1 | 7/2015 | Kim et al. |
| 2015/0188817 | A1 | 7/2015 | Parker et al. |
| 2015/0208145 | A1 | 7/2015 | Parker et al. |

FOREIGN PATENT DOCUMENTS

| | | |
|---|---|---|
| JP | H10285214 | 10/1998 |
| JP | 2000-201182 | 7/2000 |
| JP | 2006-012112 | 1/2006 |
| JP | 2012-105265 | 5/2012 |
| JP | 2012-105266 | 5/2012 |

OTHER PUBLICATIONS

Extended European Patent Office Search Report in EP Application Serial No. 11187953.2 dated May 7, 2012.
Japense Patent Office Notice of Allowance in Japanese Patent Application Serial No. 2015-103217 dated May 10, 2017.
European Patent Office Action in European Patent Application Serial No. 11187953.2 dated Jul. 12, 2017.
Kim, John et al.: "Technology-Driven, Highly-Scalable Dragonfly Topology", International Symposium on Computer Architecture, 2008. ISCA '08. 35th International Symposium on Architecturei, IEEE Piscataway, NJ, Jun. 21, 2008 ( pp. 77-88).
Gratz, Paul et al., "Regional congestion awareness for load balance in networks-on-chip", High Performance Computer Architecture, 2008. HPCA 2008. IEEE 14th International Symposium on, IEEE, Piscataway, NJ, USA, Feb. 16, 2008 (pp. 203-214.).
Valinataj, Motjaba et al., "A Fault-Tolerant and Congestion-Aware Routing Algorithm for Networks-on-Chip", Design and Diagnostics of Electronic Circuits and Systems (DDECS), 2010 IEEE 13th International Symposium on, IEEE, Piscataway, NJ, USA, Apr. 14, 2010, (pp. 139-144).
Varadarajan, Srinidhi et al, "Reinforcing reachable routes", Computer Networks 43 (2003), Elsevier Science Publishers, Amsterdam, NL, vol. 43, No. 3; Oct. 22, 2003 pp. 389-416 (28 pages).
Kim, John et al., "Flattened Butterfly: A Cost Efficient Topology for High-Radix Networks", ISCA '07, Jun. 9-13, 2007 (pp. 126-137).
Scott, Steve et al., "The Black Widow of High-Radix Clos Network," Proceedings of the 33rd International Symposium on Computer Architecture (ISCA'06), Copyright 2006 (12 pages).
Kim et al., "Cost-Efficient Dragonfly Topology for Large-Scale Systems", IEEE Micro (Impact Factor: 1.81). Mar. 2009; 29:33-40. DOI: 10.1109/MM.2009.5 (3 pages).
Arimilli et al., "The PERCS High-Performance Interconnect," 2010 18th IEEE Symposium on High Performance Interconnects (2010) (8 pages).
FOLDOC Computing Dictionary: "router," Retrieved and printed on Oct. 3, 2015 from http://foldoc.org/router.
Non-Final Office Action in U.S. Appl. No. 12/195,198 dated Aug. 13, 2010.
Final Office Action in U.S. Appl. No. 12/195,198 dated Jan. 26, 2011.
Advisory Action in U.S. Appl. No. 12/195,198 dated Apr. 19, 2011.
Pre-Brief Conference Decision in U.S. Appl. No. 12/195,198 dated Jun. 17, 2011.
Examiner's Answer to Appeal Brief in U.S. Appl. No. 12/195,198 dated Oct. 12, 2011.
BPAI Decision in U.S. Appl. No. 12/195,198 mailed on Jun. 25, 2014.
Non-Final Office Action in U.S. Appl. No. 12/195,198 dated Jan. 23, 2015.
Final Office Action in U.S. Appl. No. 12/195,198 dated Jun. 5, 2015.
Notice of Allowance in U.S. Appl. No. 12/195,198 dated Sep. 21, 2015.
U.S. Appl. No. 14/583,588, filed Dec. 27, 2014 and entitled Dragonfly Processor Interconnect Network, Inventors John Kim et al.
Non-Final Office Action in U.S. Appl. No. 14/583,588 dated Sep. 10, 2015.
Final Office Action in U.S. Appl. No. 14/583,588 dated Feb. 2, 2016.
Non-Final Office Action in U.S. Appl. No. 13/290,507 dated May 16, 2013.
Final Office Action in U.S. Appl. No. 13/290,507 dated Oct. 1, 2013.
Non-Final Office Action in U.S. Appl. No. 13/290,507 dated May 13, 2014.
Notice of Allowance in U.S. Appl. No. 13/290,507 dated Oct. 15, 2014.
Notice of Allowance in U.S. Appl. No. 13/290,507 dated Jan. 26, 2015.
Notice of Allowance in U.S. Appl. No. 13/290,507 dated May 6, 2015.
U.S. Appl. No. 14/672,125, filed Mar. 28, 2015 and entitled "Progressive Adaptive Routing in a Dragonfly Processor Interconnect Network," Inventors Mike Parker et al.

(56) References Cited

OTHER PUBLICATIONS

Non Final Office Action in U.S. Appl. No. 14/672,125 dated Feb. 26, 2016.
Non-Final Office Action in U.S. Appl. No. 13/290,567 dated Feb. 12, 2014.
Final Office Action in U.S. Appl. No. 13/290,567 dated Jul. 17, 2014.
Non-Final Office Action in U.S. Appl. No. 13/290,567 dated Dec. 29, 2014.
Notice of Allowance in U.S. Appl. No. 13/290,567 dated Jul. 15, 2015.
U.S. Appl. No. 14/583,579 field on Dec. 26, 2015 entitled Table-Driven Routing in a Dragonfly Processor Interconnect Network, inventors Michael Parker et al.
Non-Final Office Action in U.S. Appl. No. 14/583,579 dated Jun. 26, 2015.
Non-Final Office Action in U.S. Appl. No. 14/583,579 dated Oct. 8, 2015.
European Patent Office Extended Search Report and Opinion in EP Application Serial No. 11187952.4 dated Feb. 28, 2012.
European Patent Office Communication Pursuant to Article 94(3) EPC in EP Application Serial No. 11187952.4 dated Jul. 23, 2013.
Japan Patent Office Action in Japanese Patent Application Serial No. 2011-241240 dated Aug. 18, 2015.
Japan Patent Office Action in Japanese Patent Application Serial No. 2015-103217 dated Mar. 22, 2016.
European Patent Office Search Report and Opinion in EP Application Serial No. 11187953.2 dated May 7, 2012.
Japan Patent Office Notification of Reasons for Rejection in Japanese Patent Application Serial No. 2011-241239 dated Aug. 11, 2015.
Japan Patent Office Notice of Allowance dated Nov. 20, 2015 Patent Application Serial No. 2011-241239.
Japan Patent Office Action in Japanese Patent Application Serial No. 2015-012380 dated Dec. 1, 2015.
Japan Patent Office Action in Japanese Patent Application Serial No. 2015-103217 dated Aug. 2, 2016.
Extended European Patent Office Search Report and Opinion in EP Application Serial No. 16180770.6 dated Jan. 13, 2017, 8 pages.
Notice of Allowance for Japanese Patent Application No. JP2015012380, dated Jun. 21, 2016, 2 pages—English Translation Available.

\* cited by examiner

TABLE-DRIVEN ROUTING IN A DRAGONFLY PROCESSOR INTERCONNECT NETWORK

CROSS-REFERENCE TO RELATED APPLICATIONS

This Application is a continuation (and claims the benefit of priority under 35 U.S.C. § 120) of U.S. patent application Ser. No. 13/290,567, filed on Nov. 7, 2011 and entitled TABLE-DRIVEN ROUTING IN A DRAGONFLY PROCESSOR INTERCONNECT NETWORK, which application claims the benefit of priority, under 35 U.S.C. § 119(e), to U.S. Provisional Patent Application Ser. No. 61/410,641, filed on Nov. 5, 2010 and entitled "TABLE-DRIVEN ROUTING IN A DRAGONFLY PROCESSOR INTERCONNECT NETWORK," inventors Mike Parker et al. The disclosures of the prior Applications are considered part of and are incorporated by reference in the disclosure of this Application.

FIELD OF THE INVENTION

The invention relates generally to computer interconnect networks, and more specifically in one embodiment to table-driven routing in a dragonfly topology processor interconnect network.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computer systems have long relied on network connections to transfer data, whether from one computer system to another computer system, one computer component to another computer component, or from one processor to another processor in the same computer. Most computer networks link multiple computerized elements to one another, and include various functions such as verification that a message sent over the network arrived at the intended recipient, confirmation of the integrity of the message, and a method of routing a message to the intended recipient on the network.

Processor interconnect networks are used in multiprocessor computer systems to transfer data from one processor to another, or from one group of processors to another group. The number of interconnection links can be very large with computer systems having hundreds or thousands of processors, and system performance can vary significantly based on the efficiency of the processor interconnect network. The number of connections, number of intermediate nodes between a sending and receiving processing node, and the speed or type of connection all play a factor in the interconnect network performance.

Similarly, the network topology, or pattern of connections used to tie processing nodes together affects performance, and remains an area of active research. It is impractical to directly link each node to each other node in systems having many tens of processors, and all but impossible as the number of processors reaches the thousands.

Further, the cost of communications interfaces, cables, and other factors can add significantly to the cost of poorly designed or inefficient processor interconnect networks, especially where long connections or high-speed fiber optic links are required. A processor interconnect network designer is thereby challenged to provide fast and efficient communication between the various processing nodes, while controlling the number of overall links, and the cost and complexity of the processor interconnect network.

The topology of a network, or the method used to determine how to link a processing node to other nodes in a multiprocessor computer system, is therefore an area of interest.

SUMMARY

The invention comprises in one example a multiprocessor computer system having a dragonfly processor interconnect network that comprises a plurality of processor nodes and a plurality of routers. The routers are operable route data by selecting from among a plurality of network paths from a target node to a destination node in the dragonfly network based on one or more routing table, such as local and global routing tables, and minimal and non-minimal routing tables.

DETAILED DESCRIPTION

Figure 1:
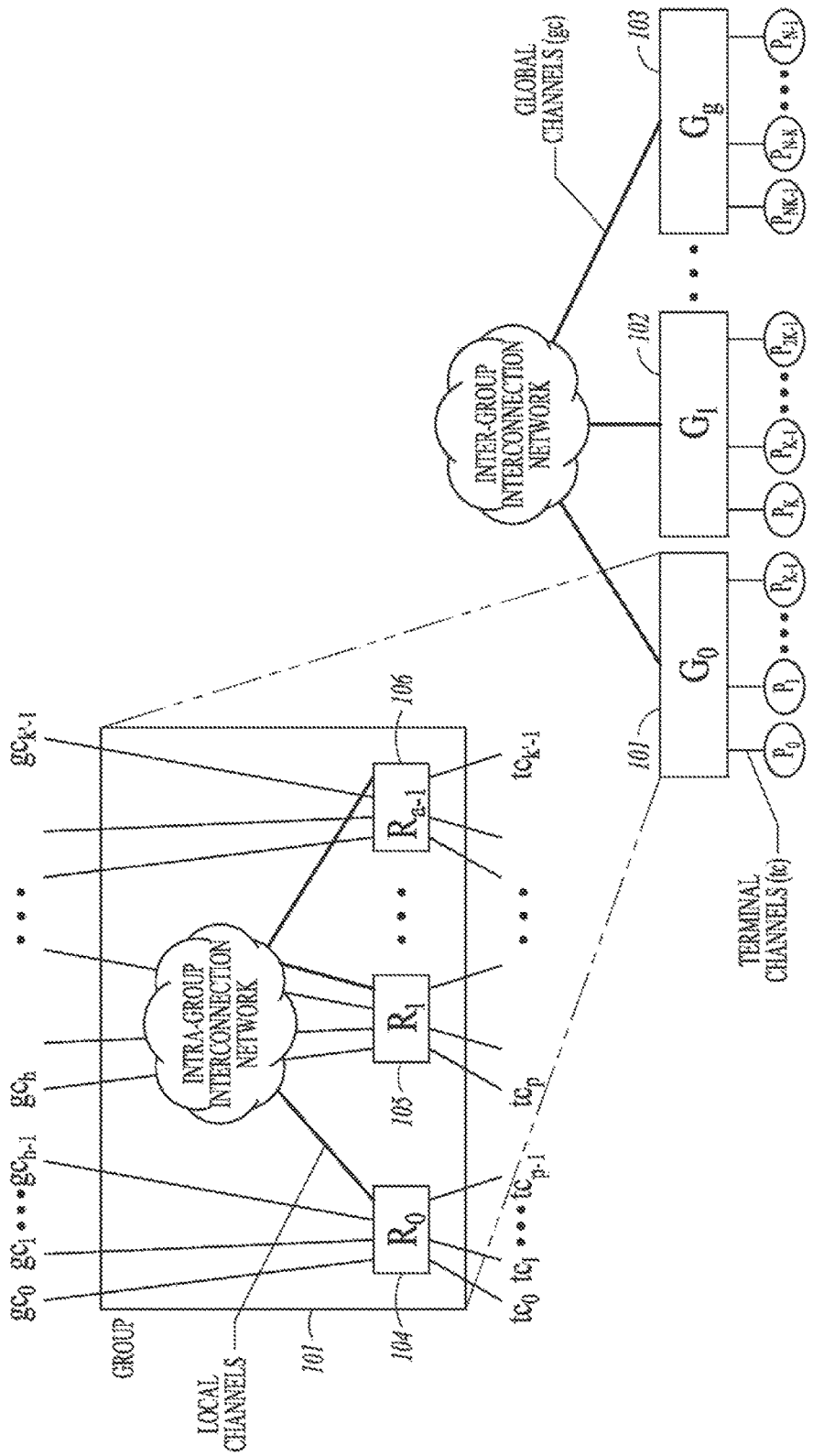
FIG. 1 is a block diagram of a dragonfly network topology, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Interconnection networks are widely used to connect processors and memories in multiprocessors, as switching fabrics for high-end routers and switches, and for connecting I/O devices. As processor and memory performance continues to increase in a multiprocessor computer system, the performance of the interconnection network plays a central role in determining the overall performance of the system. The latency and bandwidth of the network largely establish the remote memory access latency and bandwidth.

A good interconnection network typically designed around the capabilities and constraints of available technology. Increasing router pin bandwidth, for example, has motivated the use of high-radix routers in which increased bandwidth is used to increase the number of ports per router, rather than maintaining a small number of ports and increasing the bandwidth per port. The Cray Black Widow system, one of the first systems to employ a high-radix network, uses a variant of the folded-Clos topology and radix-64 routers—a significant departure from previous low-radix 3-D torus networks. Recently, the advent of economical optical signaling enables topologies with long channels. However, these long optical channels remain significantly more expensive than short electrical channels. A Dragonfly topology was therefore introduced, exploiting emerging optical signaling technology by grouping routers to further increase the effective radix of the network.

The topology of an interconnection network largely determines both the performance and the cost of the network. Network cost is dominated by the cost of channels, and in particular the cost of the long, global, inter-cabinet channels. Thus, reducing the number of global channels can significantly reduce the cost of the network. To reduce global channels without reducing performance, the number of global channels traversed by the average packet must be reduced. The dragonfly topology reduces the number of global channels traversed per packet using minimal routing to one.

Dragonfly Topology Example

To achieve this global diameter of one, very high-radix routers, with a radix of approximately $2\sqrt{N}$ (where N is the size of the network) are used. While radix 64 routers have been introduced, and a radix of 128 is feasible, much higher radices in the hundreds or thousands are needed to build machines that scale to 8K-1M nodes if each packet is limited to only one global hop using traditional very high radix router technology. To achieve the benefits of a very high radix with routers without requiring hundreds or thousands of ports per node, the Dragonfly network topology proposes using a group of routers connected into a subnetwork as one very high radix virtual router. This very high effective radix in turn allows us to build a network in which all minimal routes traverse at most one global channel. It also increases the physical length of the global channels, exploiting the capabilities of emerging optical signaling technology.

Achieving good performance on a wide range of traffic patterns on a dragonfly topology involves selecting a routing algorithm that can effectively balance load across the global channels. Global adaptive routing (UGAL) can perform such load balancing if the load of the global channels is available at the source router, where the routing decision is made. With the Dragonfly topology, however, the source router is most often not connected to the global channel in question. Hence, the adaptive routing decision is made based on remote or indirect information.

The indirect nature of this decision leads to degradation in both latency and throughput when conventional UGAL (which uses local queue occupancy to make routing decisions) is used. We propose two modifications to the UGAL routing algorithm for the Dragonfly network topology that overcome this limitation with performance results approaching an ideal implementation using global information. Adding selective virtual-channel discrimination to UGAL (UGAL-VC H) eliminates bandwidth degradation due to local channel sharing between minimal and non-minimal paths. Using credit-round trip latency to both sense global channel congestion and to propagate this congestion information upstream (UGAL-CR) eliminates latency degradation by providing much stiffer backpressure than is possible using only queue occupancy for congestion sensing.

High-radix networks reduce the diameter of the network but require longer cables compared to low-radix networks. Advances in signaling technology and the recent development of active optical cables facilitate implementation of high-radix topologies with longer cables.

An interconnection network is embedded in a packaging hierarchy. At the lowest level, the routers are connected via circuit boards, which are then connected via a backplane or midplane. One or more backplanes are packaged in a cabinet, with multiple cabinets connected by electrical or optical cables to form a complete system. The global (inter-cabinet) cables and their associated transceivers often dominate the cost of a network. To minimize the network cost, the topology should be matched to the characteristics of the available interconnect technologies, such as cost and performance.

The maximum bandwidth of an electrical cable drops with increasing cable length because signal attenuation due to skin effect and dielectric absorption increases linearly with distance. For typical high-performance signaling rates (10-20 Gb/s) and technology parameters, electrical signaling paths are limited to about 1 m in circuit boards and 10 m in cables. At longer distances, either the signaling rate must be reduced or repeaters inserted to overcome attenuation.

Historically, the high cost of optical signaling limited its use to very long distances or applications that demanded performance regardless of cost. Although optical cables have a higher fixed cost, their ability to transmit data over long distances at several times the data rate of copper cables results in a lower cost per unit distance than electrical cables. Based on the data available using current technologies, the break-even point is at 10 m. For distances shorter than 10 m, electrical signaling is less expensive. Beyond 10 m, optical signaling is more economical. The Dragonfly topology exploits this relationship between cost and distance. By reducing the number of global cables, it minimizes the effect of the higher fixed overhead of optical signaling, and by making the global cables longer, it maximizes the advantage of the lower per-unit cost of optical fibers.

The dollar cost of a dragonfly also compares favorably to a flattened butterfly for networks larger than 1 k nodes, showing approximately a 10% savings for up to 4 k nodes, and approximately a 20% cost savings relative to flattened butterfly topologies for more than 4 k nodes as the dragonfly has fewer long, global cables. Folded Clos and 3-d torus networks suffer in comparison, because of the larger number of cables needed to support high network diameters. For a network of only 1 k nodes, the dragonfly is 62% the cost of a 3-d torus network and 50% that of a folded Clos network. This reduction in network cost is directly correlated to a reduction in network power consumed, which is a significant advantage for large networks as well as for installations that are desirably environmentally friendly.

The example embodiments of a dragonfly network presented here show how use of a group of routers as a virtual router can increase the effective radix of a network, and hence reduce network diameter, cost, and latency. Because the dragonfly topology reduces the number global cables in a network, while at the same time increasing their length, the dragonfly topology is particularly well suited for implementations using emerging active optical cables—which have a high fixed cost but a low cost per unit length compared to electrical cables. Using active optical cables for the global channels, a dragonfly network reduces cost by 20% compared to a flattened butterfly and by 52% compared to a folded Clos network of the same bandwidth.

To show an example Dragonfly network topology, the following symbols are used in the description of the dragonfly topology and in example routing algorithms presented later:

N Number of network terminals
p Number of terminals connected to each router
a Number of routers in each group
k Radix of the routers
k_ Effective radix of the group (or the virtual router)
h Number of channels within each router used to connect to other groups
g Number of groups in the system
q Queue depth of an output port
qvc Queue depth of an individual output VC
H Hop count
Outi Router output port i The Dragonfly topology is a hierarchical network with three levels, as shown in FIG. 1: routers (104, 105, and 106), groups (101, 102, and 103), and system. At the router level, each router has connections top nodes, a—1 local channels—to other routers in the same group—and h global channels—to routers in other groups. Therefore the radix (or degree) of each router is defined as k=p+a+h−1. A group consists of a routers connected via an intra-group interconnection network formed from local channels, as shown at 101 in FIG. 1. Each group has ap connections to terminals and ah connections to global channels, and all of the routers in a group collectively act as a virtual router with radix k'=a(p+h). This very high radix, k'>>k enables the system level network to be realized with very low global diameter (the maximum number of expensive global channels on the minimum path between any two nodes). Up to g=ah+1 groups (N=ap(ah+1) terminals) can be connected with a global diameter of one. In contrast, a system-level network built directly with radix k routers would require a larger global diameter.

In a maximum-size (N=ap(ah+1)) dragonfly, there is exactly one connection between each pair of groups. In smaller dragonflies, there are more global connections out of each group than there are other groups. These extra global connections are distributed over the groups with each pair of groups connected by at least _ah+1 g_channels.

The dragonfly parameters a, p, and h can have any values. However, to balance channel load, the network in this example has a=2p=2h. Because each packet traverses two local channels along its route (one at each end of the global channel) for one global channel and one terminal channel, this ratio maintains balance. Because global channels are expensive, deviations from this 2:1 ratio are done in some embodiments in a manner that overprovisions local and terminal channels, so that the expensive global channels remain fully utilized. That is, the network is balanced in such examples so that a≥2h, 2p≥2h.

Figure 2:
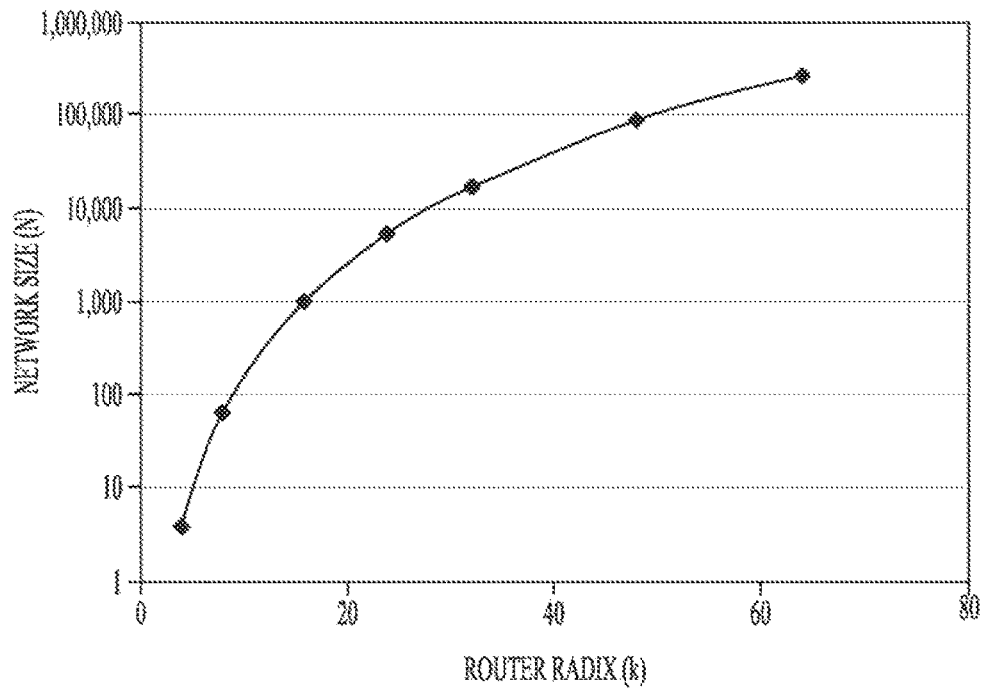
FIG. 2 is a graph illustrating scalability of a dragonfly network in nodes for various router radices, consistent with an example embodiment of the invention.
Figure 3:
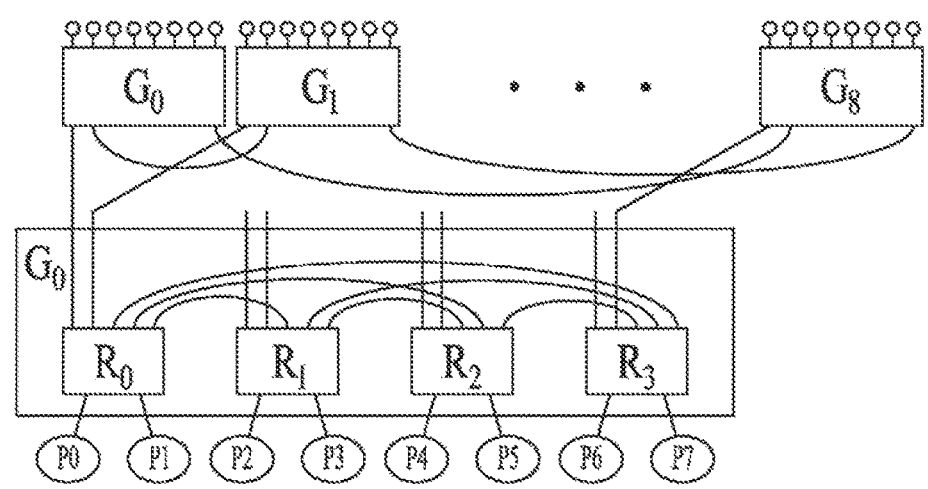
FIG. 3 is a block diagram illustrating a dragonfly network topology, consistent with an example embodiment of the invention.

The scalability of a balanced dragonfly is shown in FIG. 2. By increasing the effective radix, the dragonfly topology is highly scalable—with radix-64 routers, the topology scales to over 256 k nodes with a network diameter of only three hops. Arbitrary networks can be used for the intragroup and inter-group networks in FIG. 1. In the example presented here, we use a 1-D flattened butterfly or a completely-connected topology for both networks. A simple example of the dragonfly is shown in FIG. 3 with p=h=2 (two processing nodes per router and two channels within each router coupled to other groups), a=4 (four routers in each group) that scales to N=72 (72 nodes in the network) with k=7 (radix 7) routers. By using virtual routers, the effective radix is increased from k=7 to k'=16, as group $G_0$ of FIG. 3 has eight global connections and eight node connections.

Figure 4:
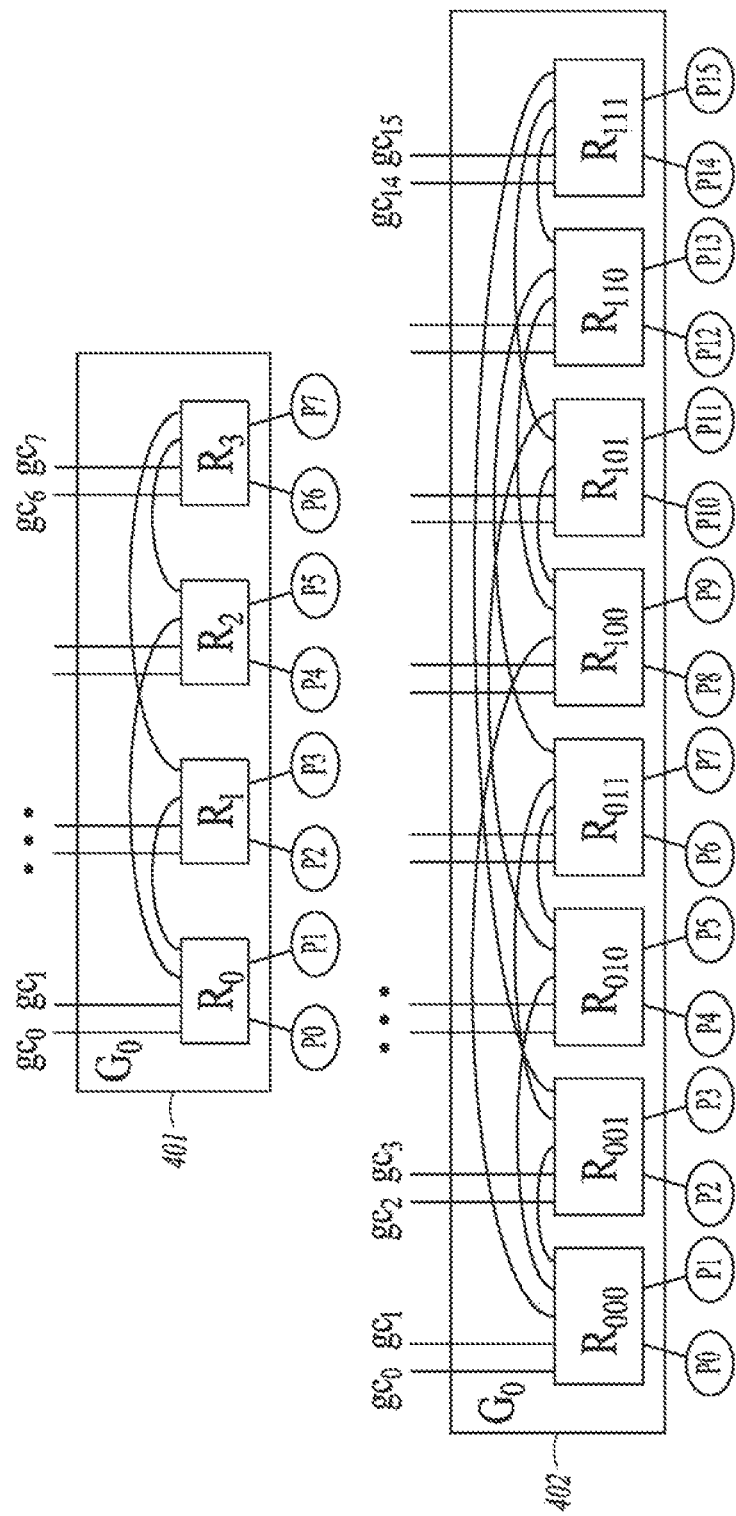
FIG. 4 is block diagram of dragonfly network topology groups, consistent with some example embodiments of the invention.

The global radix, k', can be increased further by using a higher-dimensional topology for the intra-group network. Such a network may also exploit intra-group packaging locality. For example, a 2-D flattened butterfly is shown in FIG. 4 at 401, which has the same k' as the group shown in FIG. 5 but exploits packaging locality by providing more bandwidth to local routers. A 3-dimension flattened butterfly is used in FIG. 4 at 402 to increase the effective radix from k'=16 to K'=32—allowing the topology to scale up to N=1056 using the same k=7 router as in FIG. 1.

To increase the terminal bandwidth of a high-radix network such as a dragonfly, channel slicing can be employed. Rather than make the channels wider, which would decrease the router radix, multiple network can be connected in parallel to add capacity. Similarly, the dragonfly topology in some embodiments can also utilize parallel networks to add capacity to the network. In addition, the dragonfly networks described so far assumed uniform bandwidth to all nodes in the network. However, if such uniform bandwidth is not needed, bandwidth tapering can be implemented by removing inter-group channels among some of the groups.

Dragonfly Routing Examples

A variety of minimal and non-minimal routing algorithms can be implemented using the dragonfly topology. Some embodiments of global adaptive routing using local information lead to limited throughput and very high latency at intermediate loads. To overcome these problems, we introduce new mechanisms to global adaptive routing, which provide performance that approaches an ideal implementation of global adaptive routing.

Minimal routing in a dragonfly from source node s attached to router Rs in group Gs to destination node d attached to router Rd in group Gd traverses a single global channel and is accomplished in three steps:

Step 1: If Gs_=Gd and Rs does not have a connection to Gd, route within Gs from Rs to Ra, a router that has a global channel to Gd.

Step 2: If Gs_=Gd, traverse the global channel from Ra to reach router Rb in Gd.

Step 3: If Rb_=Rd, route within Gd from Rb to Rd.

This minimal routing works well for load-balanced traffic, but results in poor performance on adversarial traffic patterns. To load-balance adversarial traffic patterns, Valiant's algorithm can be applied at the system level—routing each packet first to a randomly-selected intermediate group Gi and then to its final destination d. Applying Valiant's algorithm to groups suffices to balance load on both the global and local channels. This randomized non-minimal routing traverses at most two global channels and requires five steps:

Step 1: If Gs_=Gi and Rs does not have a connection to Gi, route within Gs from Rs to Ra, a router that has a global channel to Gi.

Step 2: If Gs_=Gi traverse the global channel from Ra to reach router Rx in Gi.

Step 3: If Gi_=Gd and Rx does not have a connection to Gd, route within Gi from Rx to Ry, a router that has a global channel to Gd.

Step 4: If Gi_=Gd, traverse the global channel from Ry to router Rb in Gd.

Step 5: If Rb_=Rd, route within Gd from Rb to Rd.

Figure 5:
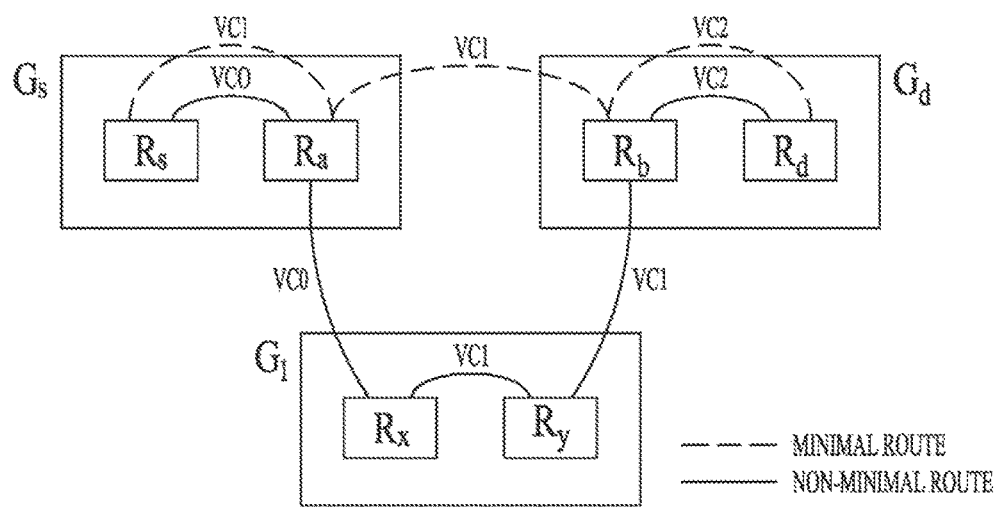
FIG. 5 is a block diagram of a dragonfly network illustrating minimal and non-minimal routing using virtual channels, consistent with an example embodiment of the invention.

To prevent routing deadlock, two virtual channels (VCs) are employed for minimal routing and three VCs are required for non-minimal routing, as shown in FIG. 5. These virtual router assignments eliminate all channel dependencies due to routing. For some applications, additional virtual channels may be required to avoid protocol deadlock—e.g., for shared memory systems, separate sets of virtual channels may be required for request and reply messages.

A variety of routing algorithms for the dragonfly topology have been evaluated, including:

Minimal (MIN): The minimal path is taken as described previously.

Valiant (VAL) [32]: Randomized non-minimal routing as described previously.

Universal Globally-Adaptive Load-balanced [29] (UGALG,UGAL-L) UGAL chooses between MIN and VAL on a packet-by-packet basis to load-balance the network. The choice is made by using queue length and hop count to estimate network delay and choosing the path with minimum delay. We implement two versions of UGAL.

UGAL-L—uses local queue information at the current router node.

UGAL-G—uses queue information for all the global channels in Gs—assuming knowledge of queue lengths on other routers. While difficult to implement, this represents an ideal implementation of UGAL since the load-balancing is required of the global channels, not the local channels.

Figure 6:
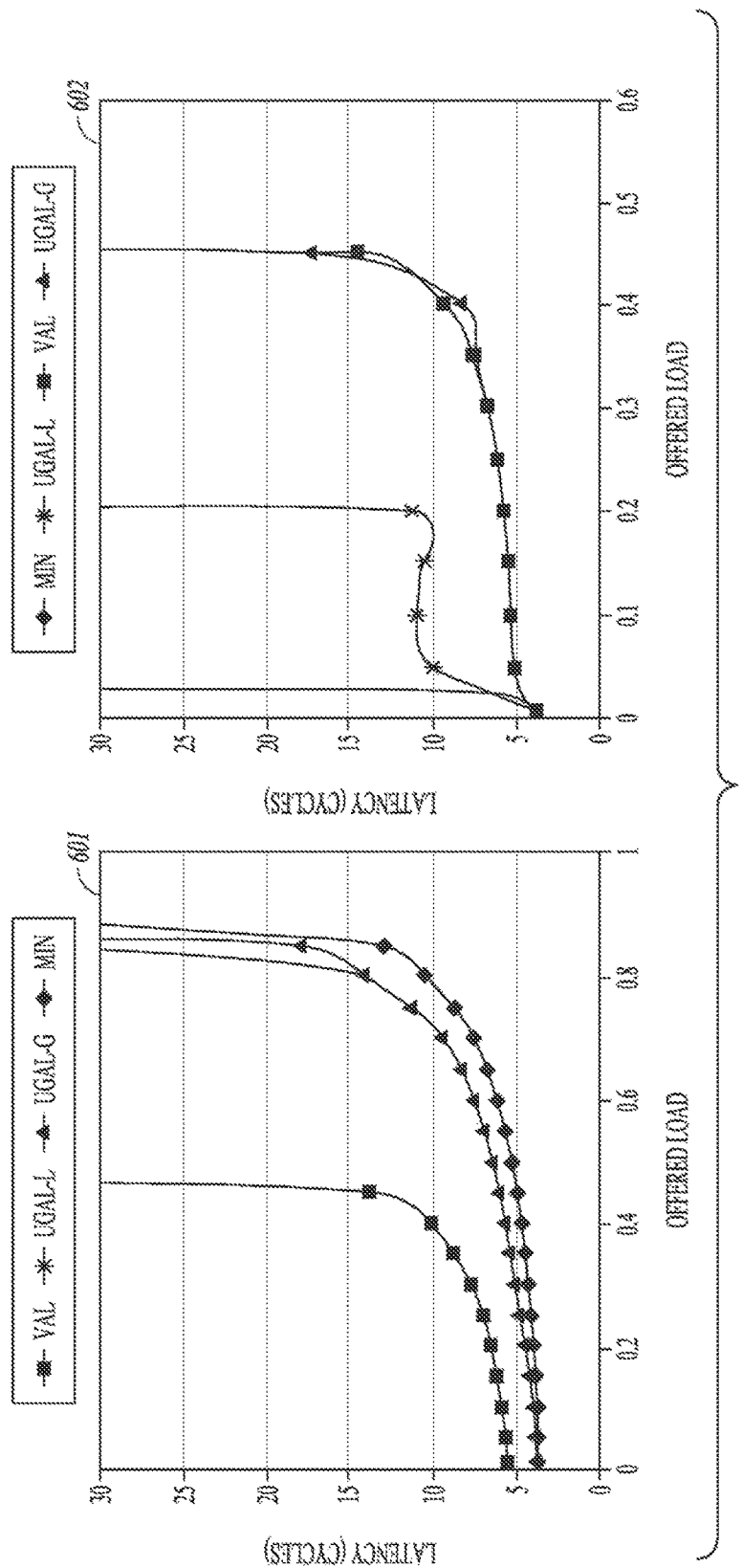
FIG. 6 is a graph illustrating latency v. offered load for a variety of routing algorithms using various traffic patterns, consistent with an example embodiment of the invention.

The different routing algorithms are evaluated using both benign and adversarial synthetic traffic patterns, as shown in FIG. 6. Latency v. offered load is shown for the four routing algorithms, using both uniform random traffic at 601 and adversarial traffic at 602. The use of a synthetic traffic pattern allows us to stress the topology and routing algorithm to fully evaluate the network. For benign traffic such as uniform random (UR), MIN is sufficient to provide low latency and high throughput, as shown at 601 of FIG. 6. VAL achieves approximately half of the network capacity because its load-balancing doubles the load on the global channels. Both UGAL-G and UGAL-L approach the throughput of MIN, but with slightly higher latency near saturation. The higher latency is caused by the use of parallel or greedy allocation where the routing decision at each port is made in parallel. The use of sequential allocation will reduce the latency at the expense of a more complex allocator.

Adaptive routing on the dragonfly is challenging because it is the global channels, the group outputs, that need to be balanced, not the router outputs. This leads to an indirect routing problem. Each router picks a global channel to use using only local information that depends only indirectly on the state of the global channels. Previous global adaptive routing methods used local queue information, source queues and output queues, to generate accurate estimates of network congestion. In these cases, the local queues were an accurate proxy of global congestion, because they directly indicated congestion on the routes they initiated. With the dragonfly topology, however, local queues only sense congestion on a global channel via backpressure over the local channels. If the local channels are overprovisioned, significant numbers of packets must be enqueued on the overloaded minimal route before the source router will sense the congestion. This results in a degradation in throughput and latency as shown earlier in FIG. 6 at 602.

A throughput issue with UGAL-L arises due to a single local channel handling both minimal and non-minimal traffic. For example, in FIG. 7, a packet in R1 has a minimal path which uses gc7 and a nonminimal path which uses gc6. Both paths share the same local channel from R1 to R2. Because both paths share the same local queue (and hence have the same queue occupancy) and the minimal path is shorter (one global hop vs two), the minimal channel will always be selected, even when it is saturated. This leads to the minimal global channel being overloaded and the non-minimal global channels that share the same router as the minimal channel being under utilized. With UGAL-G, the minimal channel is preferred and the load is uniformly balanced across all other global channels. With UGAL-L, on the other hand, the non-minimal channels on the router that contains the minimal global channel are under utilized—resulting in a degradation of network throughput.

To overcome this limitation, we modify the UGAL algorithm to separate the queue occupancy into minimal and nonminimal components by using individual VCs (UGAL-L VC).

if$_{(qm\ vcHm \leq qnm\ vcHnm)}$
   route minimally;
else
   route nonminimally;

where the subscript m and nm denote the minimal and nonminimal paths. If the VC assignment of FIG. 5 is used, qm vc=q(V C1) and qnm vc=q(V C0).

When compared, UGAL-LVC matches the throughput of UGAL-G on a WC traffic pattern but for UR traffic, the throughput is limited, with approximately 30% reduction in throughput. For the WC traffic, where most of the traffic needs to be sent non-minimally, UGALLVC performs well since the minimal queue is heavily loaded. However, for load-balanced traffic when most traffic should be sent minimally, individual VCs do not provide an accurate representation of the channel congestion—resulting in throughput degradation.

To overcome this limitation, we further modify the UGAL algorithm to separate the queue occupancy into minimal and non-minimal components only when the minimal and non-minimal paths start with the same output port. Our hybrid modified UGAL routing algorithm (UGAL-L VC H) is:

if$_{(qmHm \leq qnmHnm\ \&\&\ Outm\_=Outnm) || (qm\ vcHm \leq qnm\ vcHnm\ \&\&\ Outm=Outnm)}$ route minimally;

else route nonminimally;

Compared to UGAL-L VC, UGAL-L VC H provides the same throughput on WC traffic pattern but matches the throughput of UGAL-G on UR traffic but resulting in nearly 2× higher latency at an offered load of 0.8, near saturation. For WC traffic, UGAL-L VC H also results in higher intermediate latency compared to UGAL-G.

The high intermediate latency of UGAL-L is due to minimally-routed packets having to fill the channel buffers between the source and the point of congestion before congestion is sensed. Our research shows that non-minimally routed packets have a latency curve comparable to UGAL-G while minimally-routed packets see significantly higher latency. As input buffers are increased, the latency of minimally-routed packets increases and is proportional to the depth of the buffers. A histogram of latency distribution shows two clear distributions—one large distribution with low latency for the non-minimal packets and another distribution with a limited number of packets but with much higher latency for the minimal packets.

Figure 7:
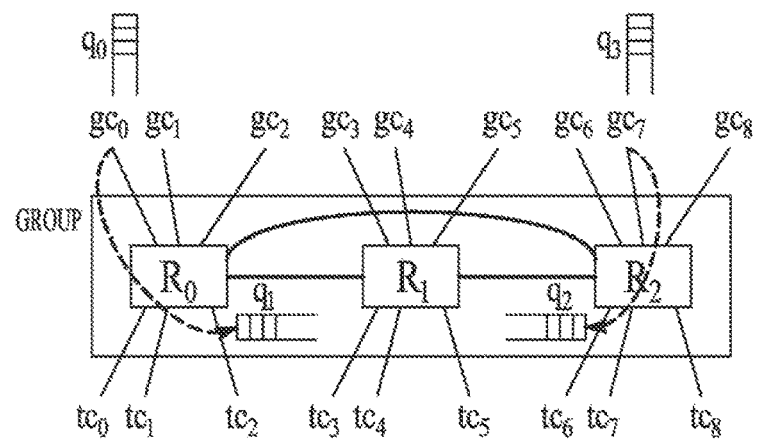
FIG. 7 is a node group diagram of a dragonfly topology network illustrating adaptive routing via global channels using backpressure from intermediate nodes, consistent with an example embodiment of the invention.

To understand this problem with UGAL-L, in the example dragonfly group shown in FIG. 7, assume a packet in R1 is making its global adaptive routing decision of routing either minimally through gc0 or non-minimally through gc7. The routing decision needs to load balance global channel utilization and ideally, the channel utilization can be obtained from the queues associated with the global channels, q0 and q3. However, q0 and q3 queue informations are only available at R0 and R2 and not readily available at R1—thus, the routing decision can only be made indirectly through the local queue information available at R1.

In this example, q1 reflects the state of q0 and q2 reflects the state of q3. When either q0 or q3 is full, the flow control provides backpressure to q1 and q2 as shown with the arrows in FIG. 7. As a result, in steady-state measurement, these local queue information can be used to accurately measure the throughput. Since the throughput is defined as the offered load when the latency goes to infinity (or the queue occupancy goes to infinity), this local queue information is sufficient. However, q0 needs to be completely full in order for q1 to reflect the congestion of gc0 and allow R1 to route packets non-minimally. Thus, using local information requires sacrificing some packets to properly determine the congestion—resulting in packets being sent minimally having much higher latency. As the load increases, although minimally routed packets continue to increase in latency, more packets are sent non-minimally and results in a decrease in average latency until saturation.

In order for local queues to provide a good estimate of global congestion, the global queues need to be completely full and provide a stiff backpressure towards the local queues. The stiffness of the backpressure is inversely proportional to the depth of the buffer—with deeper buffers, it takes longer for the backpressure to propagate while with shallower buffers, a much stiffer backpressure is provided. As the buffer size decreases, the latency at intermediate load is decreased because of the stiffer backpressure. However, using smaller buffers comes at the cost of reduced network throughput.

To overcome the high intermediate latency, we propose using credit round-trip latency to sense congestion faster and reduce latency. In credit-based flow control, illustrated in FIGS. 8A-8B, credit counts are maintained for buffers downstream. As packets are sent downstream, the appropriate credit count is decremented and once the packet leaves downstream router, credits are sent back upstream and the credit count is incremented. The latency for the credits to return is referred to as credit round-trip latency (tcrt) and if there is congestion downstream, the packet cannot be immediately processed and results in an increase in tcrt.

Figure 8A:
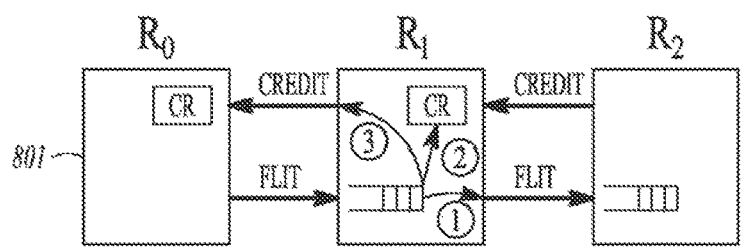
FIGS. 8A-8B are node diagrams illustrating credit round trip latency tracking, consistent with an example embodiment of the invention.
Figure 8B:
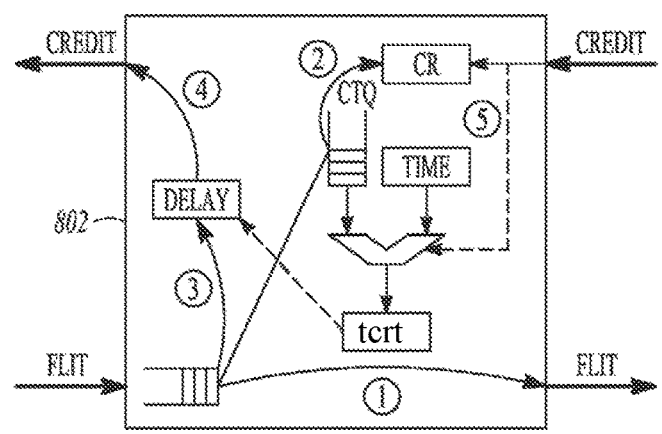

Referring to FIG. 8A, conventional credit flow control is illustrated at 801. As packets are sent downstream (1), the output credit count is decremented (2) and credits are sent back upstream (3). This scheme is modified as shown in FIG. 8B at 802 to use credit round trip latency to estimate congestion in the network. In addition to the output credit count being decremented (2), the time stamp is pushed into the credit time queue, denoted CTQ. Before sending the credit back upstream (4), the credit is delayed (3), and when downstream credits are received (5), the credit count is updated as well as the credit round trip latency tcrt.

The value of tcrt can be used to estimate the congestion of global channels. By using this information to delay upstream credits, we stiffen the backpressure and more rapidly propagate congestion information up stream. For each output O, tcrt(O) is measured and the quantity td(O) =tcrt(O)−tcrt0 is stored in a register. Then, when a flit is sent to output O, instead of immediately sending a credit back upstream, the credit is delayed by td(O)−min [td(o)]. The credits sent across the global channels are not delayed. This ensures that there is no cyclic loop in this mechanism and allows the global channels to be fully utilized.

The delay of returning credits provides the appearance of shallower buffers to create a stiff backpressure. However, to ensure that the entire buffer gets utilized and there is no reduced throughput at high load, the credits needs to delayed by the variance of td across all outputs. We estimate the variance by finding min [td(o)] value and using the difference. By delaying credits, the upstream routers observes congestion at a faster rate (compared to waiting for the queues to fill up) and leads to better global adaptive routing decisions.

The UGAL-L routing algorithm evaluation using credit latency (UGAL-LCR) is investigated for both WC and UR traffic using buffers of depth 16 and 256. UGAL-LCR leads to significant reduction in latency compared to UGALL and approaches the latency of UGAL-G. For WC traffic, UGAL-LCR reduces latency by up to 35% with 16 buffers and up to over 20× reduction in intermediate latency with 256 buffers compared to UGAL-L. Unlike UGAL-L, the intermediate latency with UGAL-LCR is independent of buffer size. For UR traffic, UGAL-LCR provides up to 50% latency reduction near saturation compared to UGAL-LVC H. However, both UGAL-LCR and UGALL VC H fall short of the throughput of UGAL-G with UR traffic because their imprecise local information results in some packets being routed non-minimally.

The implementation of this scheme results in minimal complexity overhead as the following three features are needed at each router:

tracking credits individually to measure tcrt registers to store td values a delay mechanism in returning credits The amount of storage required for td is minimal as only O(k) registers are required. The credits are often returned by piggybacking on data flits and delaying credits to wait for the transmission of the next data flit upstream is required. The proposed mechanism only requires adding additional delay.

As for tracking individual credits, credits are conventionally tracked as a pool of credits in credit flow control—i.e., a single credit counter is maintained for each output VC and increments when a credit is received. The implementation of UGAL-LCR requires tracking each credit individually. This can be done by pushing a timestamp on the tail of a queue each time a flit is sent, as shown in FIG. 17(b) with the use of a credit timestamp queue (CTQ), and popping the timestamp off the head of the queue when the corresponding credit arrives. Because flits and credits are 1:1 and maintain ordering, the simple queue suffices to measure round-trip credit latency. The depth of the queue needs to be proportional to the depth of the data buffers but the queue size can be reduced to utilize imprecise information to measure congestion—e.g., by having a queue which is only ¼ of the data buffer size, only one of four credits are tracked to measure the congestion.

The cost of a dragonfly topology also compares favorably to a flattened butterfly, as well as to other topologies. The flattened butterfly topology reduces network cost of a butterfly by removing intermediate routers and channels. As a result, the flattened butterfly reduces cost by approximately 50% compared to a folded-Clos on balanced traffic. The dragonfly topology extends the flattened butterfly by increasing the effective radix of the routers to further reduce the cost and increase the scalability of the network.

A comparison of dragonfly and flattened butterfly networks of 64 k nodes shows that a flattened butterfly uses 50% of the router ports for global channels, while a dragonfly uses 25% of the ports for global connections. The flattened butterfly requires two additional dimensions, while the dragonfly is a single dimension. In addition, the dragonfly provides better scalability because the group size can be increased to scale the network whereas scaling the flattened butterfly requires adding additional dimensions. With the hop count nearly identical, the dragonfly trades off longer global cables for smaller number of global cables required to provide a more cost-efficient topology better matched to emerging signaling technologies.

Various embodiments of dragonfly networks described here also comprise two new variants of global adaptive routing that overcome the challenge of indirect adaptive routing presented by the dragonfly. A dragonfly router will typically make a routing decision based on the state of a global channel attached to a different router in the same group. Conventional global adaptive routing algorithms that use local queue occupancies to infer the state of this remote channel give degraded throughput and latency. We introduce the selective use of virtual channel discrimination to overcome the bandwidth degradation. We also introduce the use of credit round-trip latency to both sense and signal channel congestion. The combination of these two techniques gives a global adaptive routing algorithm that attempts to approach the performance of an ideal algorithm with perfect knowledge of remote channel state.

Progressive Adaptive Routing in a Dragonfly Network

An improved routing method for Dragonfly processor interconnect networks is proposed here, providing deadlock-safe adaptive routing that is operable to choose among multiple legal routes based on congestion or down links. This adaptive routing method provides improved routing performance and tolerance for downed or busy links than prior methods, and explicitly communicates congestion across channels as opposed to withholding credits, which may negatively impact bandwidth.

In some embodiments, a network route is selected from among multiple minimal routes, such as routing in different dimensions first, and optionally further selected from one or more non-minimal routes, such as using randomly chosen hops to avoid congestion or downed links.

Routing choices are presented via tables in one example, and may be biased toward certain routes or toward minimal or non-minimal routes depending on the network configuration and state. For example, route choice may be biased toward minimal routing by default for highest efficiency, with a bias switch toward non-minimal routing to protect a certain network link from arbitrarily or unnecessarily receiving additional traffic.

Congestion information is utilized in some embodiments by deriving an anticipated next link congestion from elements such as counting the number of messages in an output queue and establishing a receiving buffer congestion estimate based on factors such as credits or messages in-flight. A node can query a potential receiving node for the average "next link" output congestion, enabling the node to make a routing decision based on avoiding congested or down links.

Figure 9:
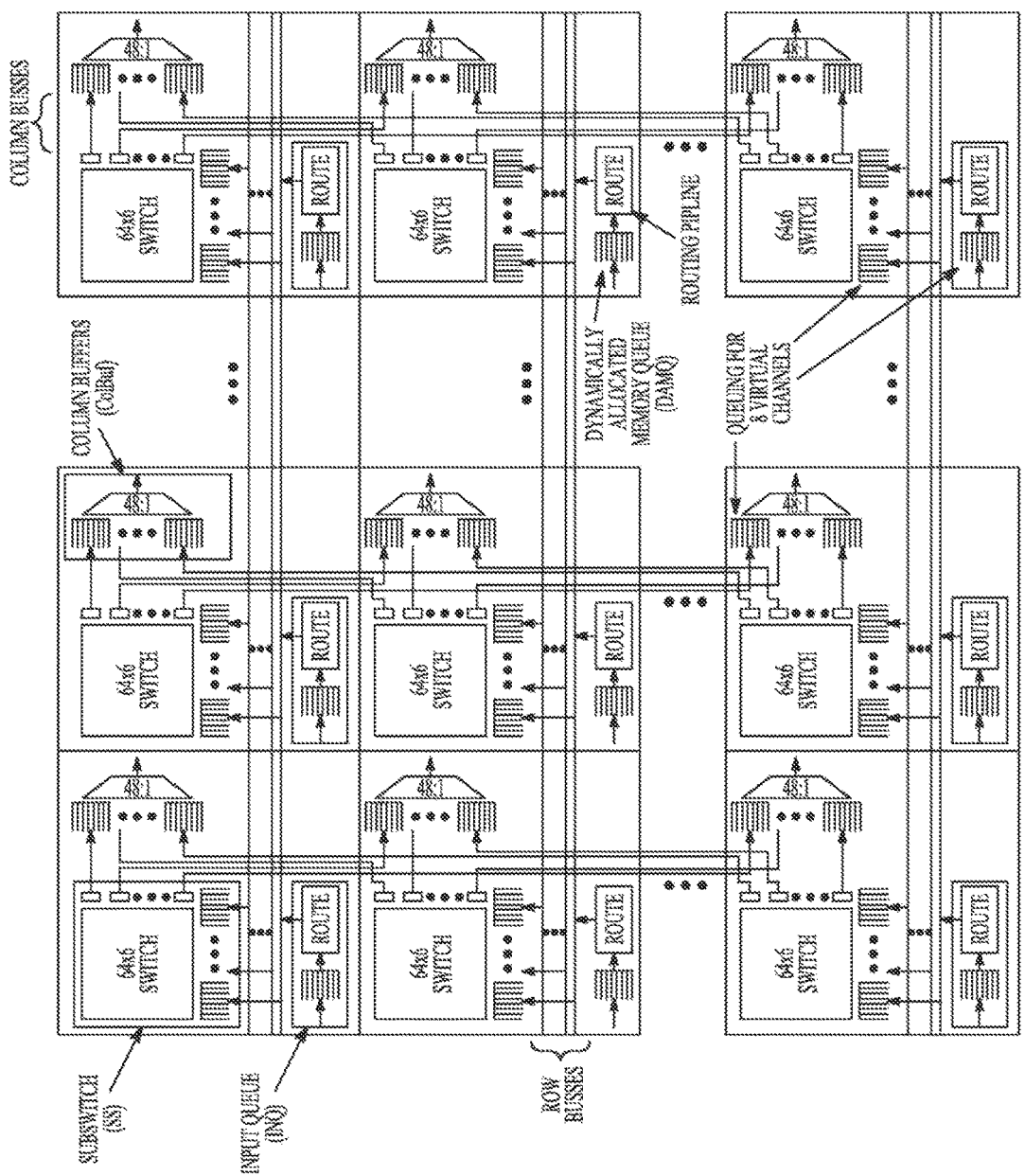
FIG. 9 shows a router configuration, consistent with an example embodiment of the invention.

FIG. 9 shows a Dragonfly network router, consistent with an example embodiment of the invention. The router block shown here comprises 48 tiles, with each tile corresponding to an input/output pair. The tiles are organized in an 8×6 matrix, such that incoming packet data at a particular tile is routed across the row to one of the 8 columns, then up or down the 8 columns to one of the 6 rows, arriving at the appropriate tile for output. The channels in further embodiments feature multiple virtual channels, virtual channel switching in-flight, error correction such as SECDED, and input buffering including dynamic allocation to virtual channels as needed to improve network performance.

Referring again to the example of FIG. 9, forty of the tiles connect to external network links, while eight of the tiles connect to processor cores local to the processor node. Each tile comprises an input queue, a subswitch, and a column buffer. The input queue receives packets from a serializer/deserializer interface to the network, and determines how to route the packet. The packet is sent across the row bus to the subswitch in the appropriate column. The subswitch receives the packets, switches them to the appropriate virtual channel, and sends the packet out one of the six column buses to the column buffer in the appropriate row. The column buffer collects the packet data from the six tiles within the column and sends the packet data across the network channel.

The dragonfly network topology in this example is a hierarchical network of two layers of a flattened butterfly topology. The first layer is a two-dimensional flattened butterfly that connects all of the router chips within a local group, such as a computer cabinet or chassis. Each group is treated as a very high-radix router, and a single dimension flattened butterfly (all-to-all) connects all of the groups to form the second layer of the dragonfly topology example presented here.

The first dimension within the group, referred to for convenience as the "green" dimension, connects the 16 routers within a chassis. The second dimension within a group is similarly called the "black" dimension, and connects the six chassis within a two cabinet group. This is reflected in the network configuration shown in the network "group" of FIG. 10, which illustrates six chassis (represented as the six rows), made up of 16 routers per chassis (represented as the 16 columns).

Figure 10:
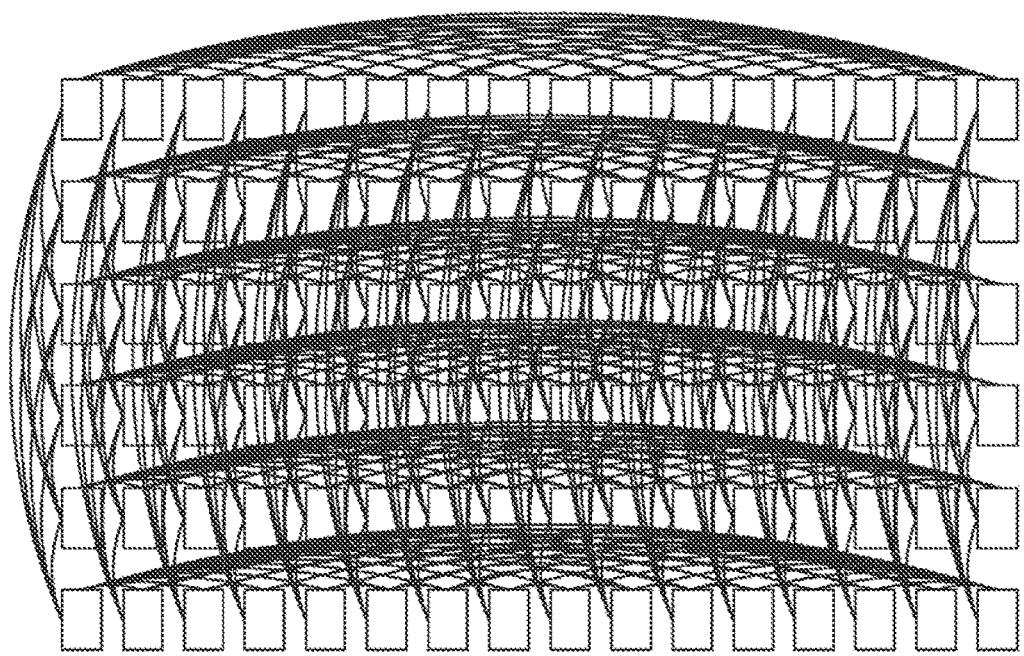
FIG. 10 shows a group of nodes in a dragonfly processor interconnect network, consistent with an example embodiment of the invention.
Figure 11:
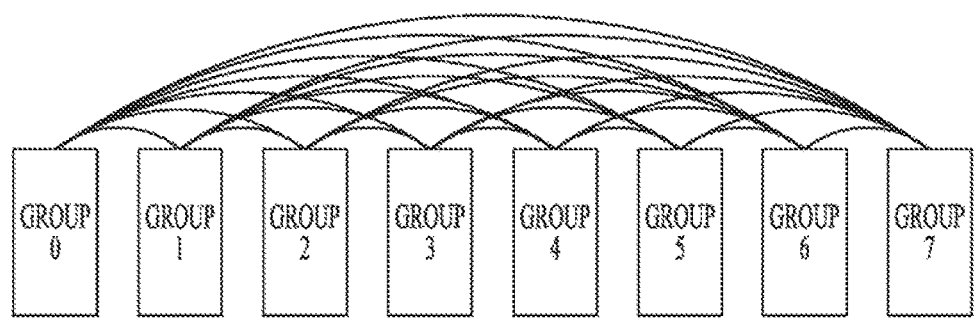
FIG. 11 shows connections between several node groups in a dragonfly processor interconnect network, consistent with an example embodiment of the invention.

Groups such as are illustrated in FIG. 10 are further coupled to one another using links in the "blue" dimension, as shown in FIG. 11. These "blue" links between groups connect each group to each other group, to a maximum of 240 blue links per group in this example, or 241 groups per system. Each link can comprise multiple ports, such as four ports per link or optical cable, resulting in four ports connecting each pair of groups over a single cable. In systems having fewer groups, unused ports from the 240 blue ports per group can be used to provide additional bandwidth between configured groups, such as two links per group pair in a network having 120 groups providing eight ports connecting each pair of groups.

In the network, packets route from a source node to a target node, traversing at least one but possibly all three dimensions shown in FIGS. 9-11. A routing path traversing all three dimensions will likely first be routed in the green dimension and then the black dimension to reach the appropriate node in a group to link to the target group, then the blue dimension to reach the intended target group. The packet is then routed in the green and black dimensions within the group to reach the intended target node in the target group, resulting in five routings within three dimensions to reach the target.

The network supports both adaptive and deterministic routing in one embodiment. Deterministic routing sends a given packet over a predetermined route over the network irrespective of network congestion. When multiple deterministic paths are available, deterministic traffic can be hashed based on a destination node, address, or other such characteristics to distribute traffic between the multiple paths. Packets traveling between the same source and target will in some embodiments arrive at the target in order, as all packets between the source and target take the same deterministic path.

Adaptive routing permits packets to take different routes based on congestion levels within the network. In some embodiments, packets may arrive out of order when using adaptive routing, and may take non-minimal paths when congestion dictates avoiding a minimal path.

Minimal routing in a dragonfly occurs when a packet traverses at most one link in a given dimension. Minimal routing within a group, such as shown in FIG. 10, will therefore take at the most one hop in the "green" dimension and one hop in the "black" dimension. A minimal path between nodes in different groups will take at most one hop in the green dimension and one hop in the black dimension in each group, and will take one additional hop to travel from the source group to the target group.

As either the black or green dimensions may be traversed first, there are multiple minimal paths, both in the source and destination groups. If multiple links between groups exist, one path may not require a hop in the black or green dimension in either the source or destination groups, reducing the total number of hops needed to complete a minimal path to less than five.

Non-minimal routing can take multiple hops in either the black or green dimension in the source or target groups, resulting in more than five hops. Additional hops may be desirable in circumstances where congestion is present in the minimal path or paths available to the router, improving the speed of message delivery to the target while avoiding further congesting an already congested network link. Further embodiments attempt to spread traffic over available links, such as by randomizing or hashing path selection to avoid creating additional congested network regions as a result of repeatedly routing the same path around a previously congested link.

In one such embodiment, an intermediate node is chosen in the group such as that of FIG. 10, such that the message is first minimally routed to the intermediate node, and then routed from the intermediate node to the final node in the group. This results in up to two hops in each of the green and black dimensions, or double the number of hops in minimal routing within a group. Routing may be nonminimal within the source group, nonminimal within the target group, or nonminimal in both the source and target groups.

Nonminimal routing can also occur between groups, such as where a message is routed minimally within the source and target groups but is routed through an intermediate group between the source and target groups to avoid congestion in the link between the source and target groups. Routing within the source, intermediate, and target groups may further be minimal or nonminimal, depending on congestion within each of the groups.

The type of routing used for a given packet or message is determined in one embodiment by a routing control field in the packet header. For example, the routing control symbol may indicate that deterministic non-minimal hashed routing is to be used when preserving packet order is desired. Packets are distributed across available paths using the target node as a hash. Traffic is routed nonminimally, but distributing the packets among various intermediate nodes in the group results in reduced hot spots or congestion.

Deterministic minimal hashed routing provides hashing of packets over minimal paths, which reduces the number of hops in a given group by permitting routing over alternate minimal paths, such as black dimension before green dimension or green dimension before black dimension. This can result in severe network congestion in certain situations, and so may not be desirable unless global traffic is particularly uniformly distributed.

Deterministic minimal non-hashed routing uses a single deterministic minimal path for all traffic, which provides packet ordering but does not provide good bandwidth or load distribution among available paths. Such routing may be used for infrequent or small messages, such as control messages or latency-critical messages.

Adaptive routing can be sued as a default routing type when ordering is not required. Packets will attempt to route minimally, but may take non-minimal paths in groups or between groups to avoid network congestion. Adaptive routing is provided in some embodiments using routing tables that provide two or more minimal and two or more non-minimal ports for consideration in making a routing choice. A congestion value is computed for each node or tile in a router is calculated and distributed to other tiles in the router, such as the router tiles shown in FIG. 9. The adaptive routing algorithm considers in this example the two minimal and two nonminimal paths available, and selects from them based on the congestion values and optionally on various configured biases.

Port congestion values are derived in a further embodiment from factors such as downstream port congestion, estimated far-end link congestion, and near-end link congestion. In a specific example, two bits of downstream port congestion information are propagated across the external channel corresponding to each tile in a router chip, and updated periodically. These bits will be generated at the transmitting router chip by combining a view of congestion of downstream ports on the chip. The downstream ports that are combined into this 2-bit congestion value are selected via an MMR-configurable mask at each tile. The congestion values of these downstream ports are summed and compared to three programmable thresholds. If the sum is greater than the highest threshold, the congestion is 2'b11. If the sum is less than the highest threshold, but greater than the middle threshold, the congestion is 2'b10. If the sum is less than the middle threshold and greater than the lowest threshold, the congestion is 2'b01. Otherwise, if the sum is less than the lowest threshold, the congestion is 2'b00.

On the receiving side of the channel, this 2-bit value is mapped to a 4-bit value by indexing into a 4-entry by 4-bit wide downstream congestion remapping table. The estimated far-end link congestion is computed by tracking the number of flits sent longer than the channel round trip latency in the past that have not yet been acknowledged, and adjusting by the relative rates of flit transmission and acknowledgement receipt. The mechanism used to do this is a 5-bit wide 32-entry deep delay chain. For an MMR-configurable number of cycles (1 to 31), the router counts the number of flits transmitted into the tail position of this delay chain. After this delay, all of the values are shifted. The total expected outstanding flits on the channel (transmitted and ones for this an ack is expected) is the sum of the values in this chain. This value is compared to the outstanding credit count. The total number of outstanding credits minus the expected flits on the channel represents an estimate for the number of flits stored in the remote Input Queue.

The estimated far-end congestion is calculated as a 10-bit number. This number is converted to a 4-bit index according to a mapping table, and this 4-bit number is then remapped to another programmable 4-bit value by indexing into a 16-entry far-end congestion remapping table.

The near-end link congestion is computed by summing the flits queued in the column buffer waiting to be transmitted across the link. This sum is also a 10-bit value and is converted to a 4-bit value according to a mapping table. This 4-bit number is then remapped to another programmable 4-bit value by indexing into a 16-entry near-end congestion remapping table.

The remapped 4-bit downstream port congestion value, the remapped 4-bit far-end link congestion value, and the remapped 4-bit near-end link congestion value are combined to produce a single 4-bit congestion value per tile. This combination is done as a 3-input 4-bit unsigned saturating addition. This 4-bit congestion value is propagated to all other tiles on the chip to aid those tiles in making informed adaptive choices.

A "link alive" signal is broadcast from each ntile on the chip to all other tiles on the chip. This link alive signal for each ntile indicates whether the corresponding tile has an established serial link with the router it is connected to. Ports for which the link is not alive will be considered invalid from a port selection perspective. This allows the router to adaptively avoid recently failed links which software has not yet been able to remove from the routing tables.

The link alive signals are propagated around the router via a 2-wire serial chain that connects all of the network tiles. Each tile places its link status information on the serial chain at the appropriate bit timing. If all of the ports presented to the congestion logic are invalid, the packet will be discarded. In this case, it will be up to end-point hardware to timeout on the missing packet and up to higher-level software to retransmit or handle the error as appropriate.

At each Input Queue, the broadcast congestion values are used in making the adaptive choice between the two minimal and two non-minimal port candidates. Before using these congestion values, bias values are applied to the selected two minimal and non-minimal port congestion values. First, the values are logically extended to a 6-bit value by prepending two zeros to the most significant part of the value. The adaptive routing control type (adaptive0, adaptive1, adaptive2, or adaptive3) is used to select a set of biases from a four entry bias table. Each entry has a pair of 2-bit shift value that determines how far left to shift the minimal ports and non-minimal ports congestion values respectively. The 6-bit expanded congestion value can be shifted by zero, one, or two bits. The encoding of this field is 2'b00=shift left by zero bits (multiply by one), 2'b01=shift left by one bit (multiply by two), 2'b10=shift left by two bits (multiply by four), 2'b11=reserved.

Each bias MMR also contains a pair of 6-bit values that is added to the 6-bit expanded minimal and non-minimal congestion values. The addition is performed as a saturating add, resulting in a 6-bit number. The port corresponding to the lowest congestion is picked. If there is a tie between a minimal and a non-minimal port, the router favors the minimal port. If there is a tie between the two ports presented as non-minimal or between the two ports presented as minimal, the choice is arbitrary and may be made in any suitable way.

Table-Driven Routing Mechanism in a Dragonfly Network

The routing example presented here uses a variety of tables to determine paths available in routing a packet or message, and provide routing flexibility in the dragonfly network configuration. Different tables exist to provide routing within a group and between groups, and for minimal and non-minimal routing paths.

Figure 12:
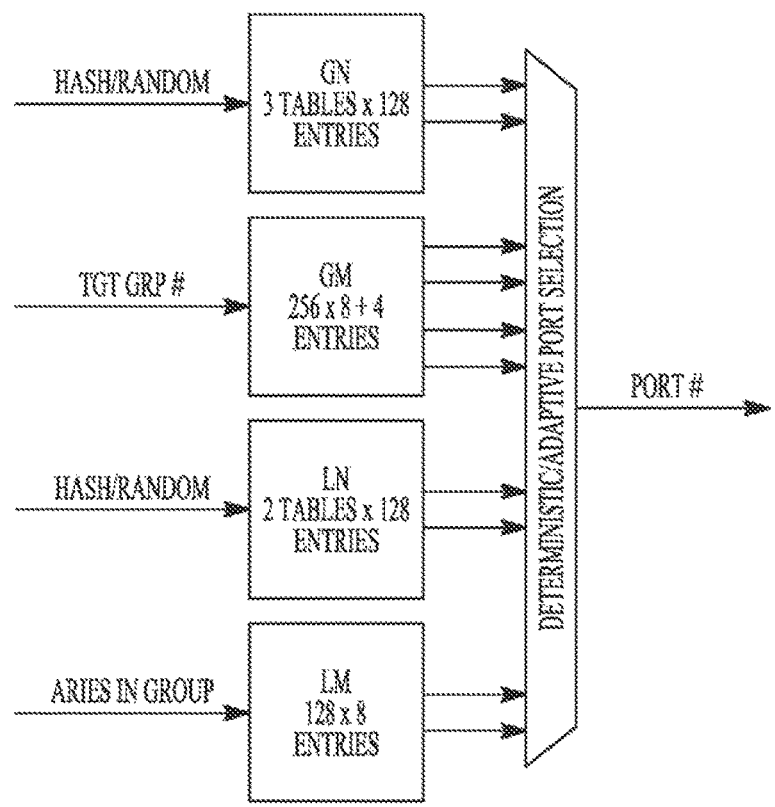
FIG. 12 shows a router table configuration for a dragonfly processor interconnect network router, consistent with an example embodiment of the invention.

The routing structures in the example router architecture presented here are divided into four distinct table sets: a global non-minimal (GN) table set, a global minimal (GM) table, a local non-minimal (LN) table set, and a local minimal (LM) table. The logical flow of this specific example is shown in FIG. 12.

The global tables are used to determine how to route to a remote group, when the current group is not the target group. They are used to route toward a particular optical port on which to exit the local group. Local tables are used to route to a particular router chip within the current group. They are used for "up" or "down" routing within the group for local routing or for "up" routing in the intermediate group. Minimal tables specify minimal local or global routes. They are used when routing down or, in the case of adaptive routing, when attempting to take a minimal path on the way up. Non-minimal tables specify non-minimal paths, and are only used when routing "up". They also provide a "root-detect" mechanism for determining when to stop routing up.

The global non-minimal table set is used to route non-minimal traffic to an intermediate group. It contains a list of ports that lead to "safe" intermediate groups, where a "safe" intermediate group is one that is connected to all other groups. (In a healthy network, all groups are safe. In a partially healthy network, the tables should be programmed to avoid sending traffic to an intermediate group that may not connect to the target group.) This table set consists of three tables. The first table selects which rank in the green dimension to traverse to leave the current (source) group.

The second table selects the black dimension to traverse. The third table selects the optical port to leave the current router chip on.

The tables are arranged hierarchically in a fixed priority order. The green dimension table has the highest priority, and the blue dimension table has the lowest. Each table lists a set of port numbers to leave the Aries on, or a special value that indicates that the current table is deferring its priority and the next table in the priority hierarchy should be consulted. A special value on the lowest priority (blue) table, if referenced, will result in an error condition. Each table consists of 128 entries, each of which is a 6-bit port number or the special value of 6'b11xxxx. Each table is organized as 16 by 8 entries, with an accompany 7-bit ECC per each block of 8 entries.

This table should only contain routes to other router chips or optical port numbers that ultimately lead to an intermediate group that can safely route to all other groups in the system. The table also provides the mechanism that distributes non-minimal traffic roughly evenly over the groups in the system. There are 128 entries in each table so that even with an effective radix-18 dimension, each port is listed 7 or 8 times, leading to at most a 14.3% imbalance between two ports in the dimension. This imbalance can be minimized by having the imbalanced ports differ on the multiple copies of the table throughout the group.

For global deterministic routing, this table set is indexed into by a hash value including the target, the tgtID, (possibly the local port number), and the optional hash field from the packet header (which comes from the packet address). Each table will get a different index. For global adaptive routing, one of the blocks of 8 entries is selected from the table at random. A second entry is selected at random from that 8-entry block. The two ports are compared with each other and with two entries from the global minimal table to determine which path to route the packet.

The green tables in the ptiles will generally have each of the 15 green ports listed 8 times and will have 8 special values. Further, at the ptiles, the black tables will have each of the 15 black ports listed approximately 7 times, with approximately 21 entries containing special values. The blue tables will have each of the optical ports listed about 13 times each.

The green ntile ports will generally have all of the entries in the green table as the special value. The black and blue tables will be configured in the same proportions as in the ptile case. The black ntile ports will generally have all of the entries in the green and black tables as the special value. The blue tables will be configured in the same proportions as the ptiles.

The global minimal table is used to determine a direct path from the current group to the target group. It consists of 256 entries, each of which is 81-bits wide. Each entry is divided in to two parts, a full port set and a restricted port set. The full port set consist of 8 6-bit port entries and a 3-bit modulo specifier. The modulo field indicates the total number of valid ports in the associated entry. The modulo specifier is encoded as the modulo minus one. That is, a value of 7 in the modulo field will result in a modulo of 8 operation. The restricted port set consists of 4 6-bit ports and a 2-bit modulo specifier. Each 81-bit entry will also have an 8-bit ECC.

This table is organized by target group numbers. Each target group corresponds to a "block" of 1, 2, 4, 8, 16, 32, 64, or 128 entries in the table, according to the size of the system. A system with 241 groups would have 1 entry per block in the table. (15 of the entries would be unused.) A system with 65-128 groups would use 2 entries per block. A system with 33-64 groups would use a block of four entries, and so forth. The group number along with zero to seven additional random (adaptive routing) or hash (deterministic routing) bits are used to index into the table. Each entry contains a list of ports leading to Aries reachable from the current point in routing that connect minimally to the associated target group, or leading directly to the target group over a blue link.

The full port set is used when just beginning to route minimally within a group (either at a ptile or an optical ntile) toward another group, or at any tile when routing non-minimally within the intermediate group and the root is detected in the local non-minimal table (see below). This side of the table lists all possible paths to all possible optical ports that are connected minimally to the group specified by the index. The restricted port set is used for routing within the group other than in the root detect and injection cases mention for the full port set table. This half of the table only represents paths in the network that are legal from the current point in the group network, assuming we are routing minimally.

The key purpose of the restricted port list is to prevent packets from flowing back in the direction from whence they came. At a green port, the restricted table entries should normally only list black and blue ports. At a black port, the restricted table entries should normally only list blue ports.

When all of the ports listed in the restricted set are invalid, this indicates to the adaptive routing logic that a packet has diverged from a legal minimal path. In this case the adaptive routing logic will pick one of the non-minimal choices. (This should never occur for deterministically or minimally routed traffic as the tables should be written in a consistent manner such that a packet never arrives at a point where it cannot route to the destination. If this does occur, the router will flag an error and discard the packet.

When there are no legal restricted routed in a tile, the mod value can be set to any value. The route table should contain the special value of 6'b11xxxx in all of the entries associated with the group number. When there is only one legal route, the port list should contain the legal route listed at least twice and the mod value set to two or higher to match.

For deterministic routing one of the valid entries in either the full or restricted set is selected by computing a modulo of a hash by the number of valid entries in the associated index. Like in the cases above, adaptive routing will choose 2 entries from the table but computing the mod on a random number and a second modulo of N−1 to add to the first number plus one to get the offset of a second random but unique entry in the table.

The local non-minimal table set is used to pick a router chip in the local group that is used as the root for non-minimal routing within the group. This table is used for non-minimal routing when the source and target group are the same. It is also used for non-minimal routing in the intermediate group. This table set is structured like the global non-minimal table, except that there is no blue table.

The local non-minimal table is indexed randomly for adaptive routing or by a hash for non-minimal deterministic routing. Similar to the global non-minimal table, for adaptive routing two entries are produced by this table and compared. To reduce the number of total RAM macros in the design, these tables will be physically combined with the global non-minimal tables in RAM.

This table lists Aries that are reachable from this tile that are safe to use for local non-minimal routing. In a healthy network, the ptiles and blue (optical) tiles should list all Aries in the group roughly evenly. Approximately 15/16 of the entries in the green table should list green ports, and ~1/16 should contain the special value indicating that the green dimension has already been satisfied and that the black table should be used. Similarly, ~5/6 of the entries in the black table should list black ports, and ~1/6 should contain the special value indicating that the black dimensions has been satisfied. A special value in both the green and black tables indicates that the root has been reached ("root detect") and that the packet should be downrouted from this point.

The green tiles should fill the green table with special values (indicating that the green dimension has been satisfied), and should list the 6 aries reachable (including self, using the special value) in the black table evenly. The black tiles should fill both the green and black tables with the special root detect value. The ptiles and optical tiles need the full table set. Ntiles could technically do without the green table, however, the router table example presented here implements them for flexibility.

The local minimal table is used for minimal routing ("downrouting") within the target group, and also when adaptively "uprouting" in the target group. This table has 128 entries. Each entry is 52 bits wide, consisting of 8 6-bit port numbers, a "diverged" bit, and a mod value indicating how many entries are valid in this line of the table. The diverged bit indicates that the path within the target group has diverged from a minimal path, and thus this path cannot be used as a minimal path when adaptively uprouting, and can only be used for downrouting. It is similar to the case in the global minimal table where all the ports in the restricted set are invalid.

This table is organized by the "target" Aries number within the group. Each local Aries number corresponds to a block of 1, 2, 4, 8, or 16 entries in the table, according to the size of the group. A group of 65-128 Aries would used a block size of 1 entry per local Aries number. A group size of 33-64 Aries would use a block size of 2, and so forth. The local Aries number along with zero to four additional random (adaptive routing) or hash (deterministic routing) bits are used to index into the table. Each entry contains a list of ports leading to the associated local Aries.

For deterministic routing one of the valid entries in the table is selected by computing a modulo of a hash by the number of valid entries in the associated index. Like in the cases above, adaptive routing will choose 2 entries from the table but computing the mod on a random number and a second modulo of N−1 to add to the first number plus one to get the offset of a second random but unique entry in the table.

The global non-minimal tables are only used in the source group for traffic headed to another group. The global non-minimal and local non-minimal tables are never used concurrently. Therefore, to reduce the total number of RAMs needed, the global non-minimal green table is stored in the same RAM as the local non-minimal green table. The global non-minimal black table is stored in the same RAM as the local non-minimal black table. The global table is stored in the lower index value portion of each of those two RAMs.

CONCLUSION

The above examples illustrate how routing in a Dragonfly network can be improved by using adaptive routing that is able to select a network path based on factors such as network congestion or traffic type, and routing tables for various routings including minimal and non-minimal, and local and global routing.

Adaptive routing provides deadlock-safe routing that chooses among multiple legal routes based on congestion or down links, providing improved routing performance and tolerance by explicitly communicating congestion across channels. Routing is performed across multiple minimal routes, such as routing in different dimensions first, and optionally further selected from one or more non-minimal routes, such as using randomly chosen hops to avoid congestion or downed links.

Congestion information is based on anticipated next link congestion from elements such as counting the number of messages in an output queue and establishing a receiving buffer congestion estimate through factors such as credits or messages in-flight. A node can query a potential receiving node for the average "next link" output congestion, enabling the node to make a routing decision based on avoiding congested or down links. Other features, such as using a deterministic hash or a random number to spread traffic in choosing a routing path are also provided, and are useful in spreading traffic to prevent congestion.

Routing choices are presented via tables in one example, and may be biased toward certain routes or toward minimal or non-minimal routes depending on the network configuration and state. For example, route choice may be biased toward minimal routing by default for highest efficiency, with a bias switch toward non-minimal routing to protect a certain network link from arbitrarily or unnecessarily receiving additional traffic. In a further example, routing tables include tables having local and global routing tables, and minimal and non-minimal paths.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A multiprocessor computer system including a dragonfly processor interconnect network, comprising:
   at least one router operable to route data by adaptively selecting from among a plurality of network paths from a target node to a destination node in the dragonfly network based on set of routing tables,
   wherein the dragonfly network comprises a plurality of routers, each of the routers is included in a respective one of a plurality of router groups, each router group is connected via a respective link to each other router group in the plurality of router groups, the set of routing tables comprises one or more local tables to be used to route data within router groups in the plurality of router groups, and the set of router tables further comprises one or more global tables to be used to route data between router groups in the plurality of router groups.

2. The multiprocessor computer system of claim 1, wherein routing within a group comprises using one or more minimal or non-minimal local routing tables.

3. The multiprocessor computer system of claim 1, wherein routing between groups comprises using one or more minimal or non-minimal global routing tables.

4. The multiprocessor computer system of claim 1, the set of routing tables comprising minimal and non-minimal tables.

5. The multiprocessor computer system of claim 1, wherein the set of routing tables are employed to provide adaptive routing between the target and destination nodes.

6. The multiprocessor computer system of claim 1, wherein adaptive routing comprises using one or more of network congestion information from neighboring routers and failed network link information from neighboring routers in selecting a route.

7. A method of operating a multiprocessor computer system, comprising:
routing data by selecting from among a plurality of network paths from a target node to a destination node in a dragonfly network based on one or more routing tables, wherein the dragonfly network comprises a plurality of routers, each of the routers is included in a respective one of a plurality of router groups, each router group is connected via a respective link to each other router group in the plurality of router groups, the set of routing tables comprises one or more local tables to be used to route data within router groups in the plurality of router groups, and the set of router tables further comprises one or more global tables to be used to route data between router groups in the plurality of router groups.

8. The method of operating a multiprocessor computer system of claim 7, wherein routing within a group comprises using one or more minimal or non-minimal local routing tables.

9. The method of operating a multiprocessor computer system of claim 7, wherein routing between groups comprises using one or more minimal or non-minimal global routing tables.

10. The method of operating a multiprocessor computer system of claim 7, the set of routing tables comprising minimal and non-minimal tables.

11. The method of operating a multiprocessor computer system of claim 7, wherein the set of routing tables are employed to provide adaptive routing between the target and destination nodes.

12. The method of operating a multiprocessor computer system of claim 7, wherein adaptive routing comprises using one or more of network congestion information from neighboring routers and failed network link information from neighboring routers in selecting a route.

13. A multiprocessor computer system router, comprising:
memory to store one or more routing tables defining one or more network paths from a target node to a destination node in the dragonfly network; and
routing logic, implemented at least in part in hardware to route data within the dragonfly network, wherein the dragonfly network comprises a plurality of routers, each of the routers is included in a respective one of a plurality of router groups, each router group is connected via a respective link to each other router group in the plurality of router groups, the set of routing tables comprises one or more local tables to be used to route data within router groups in the plurality of router groups, and the set of router tables further comprises one or more global tables to be used to route data between router groups in the plurality of router groups.

14. The multiprocessor computer system router of claim 13, wherein routing within a group comprises using one or more minimal or non-minimal local routing tables.

15. The multiprocessor computer system router of claim 13, wherein routing between groups comprises using one or more minimal or non-minimal global routing tables.

16. The multiprocessor computer system router of claim 13, the set of routing tables comprising minimal and non-minimal tables.

17. The multiprocessor computer system router of claim 13, wherein the set of routing tables are employed to provide adaptive routing between the target and destination nodes.

18. The multiprocessor computer system router of claim 17, wherein adaptive routing comprises using one or more of network congestion information from neighboring routers and failed network link information from neighboring routers in selecting a route.

* * * * *